Dec. 16, 1924.
F. W. KELLEHER
SPRAYING AND WASHING DEVICE
Filed Aug. 8, 1923
1,519,312
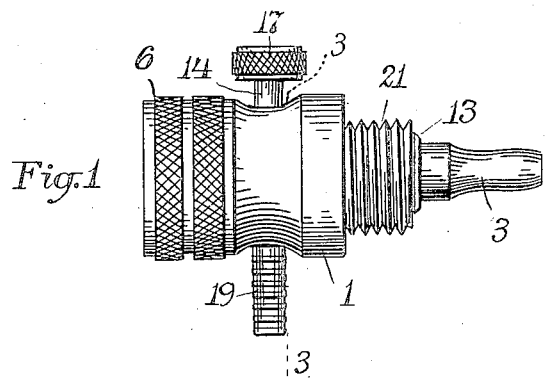
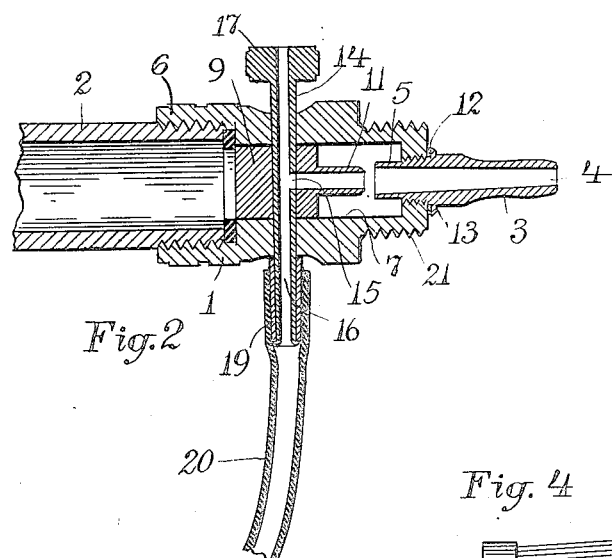
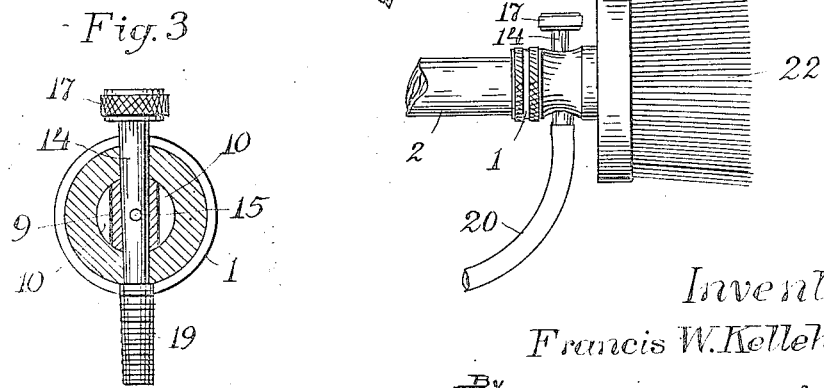
Inventor,
Francis W. Kelleher;
By
A. B. Upham,
Attorney.

Patented Dec. 16, 1924.

1,519,312

UNITED STATES PATENT OFFICE.

FRANCIS WILLIAM KELLEHER, OF CAMBRIDGE, MASSACHUSETTS, ASSIGNOR OF ONE-HALF TO ARCHIE L. MARIANI, OF EVERETT, MASSACHUSETTS.

SPRAYING AND WASHING DEVICE.

Application filed August 8, 1923. Serial No. 656,436.

*To all whom it may concern:*

Be it known that I, FRANCIS W. KELLEHER, a citizen of the United States, and a resident of Cambridge, in the county of Middlesex and Commonwealth of Massachusetts, have invented certain new and useful Improvements in Spraying and Washing Devices, of which the following is a full, clear, and exact specification.

This invention has for its object the construction of simplified and efficient means whereby to eject a liquid solution of insect-destroying poison, or for jetting either water alone, or water and a cleansing mixture upon automobiles and the like.

In carrying my invention into effect I prefer to adapt the device for attachment to a hose or faucet and to employ the stream of water for producing a vacuum which acts to take up kerosene, a saponified solution, or other liquid, and to discharge the same with the jet or spray of water upon the automobile or other painted surface to be cleansed; or, if the liquid contains an insect-destroying mixture, upon the trees or plants to be preserved.

In the drawings forming part of this specification, Fig. 1 is an outside view of the suction and mixing chamber of the device. Fig. 2 is a central longitudinal section of the same. Fig. 3 is a cross section on the line 3—3 in Fig. 1. Fig. 4 is a view on a smaller scale showing the device connected with a brush.

In the form of the device shown in Figs. 1 to 4, a tubular body 1 is designed to be screwed upon the end of a hose 2, or a faucet or other source of water under pressure, and a nozzle 3 is screwed into its opposite end. This nozzle has preferably a tapering hole 4 through it and an inwardly extending projection 5, the smallest diameter being in its outer end.

Between the nozzle 3 and the internally threaded section 6 is a chamber 7 having longitudinally positioned therein a plug 9 preferably vertically fitted within the walls of the chamber 7 but leaving spaces 10 between its vertical sides and the chamber walls for the passage of water. From the end of the plug 9 adjacent the projection 5 reaches a slender tube 11, the inner diameter of which is approximately equal to that of the outer end of the hole 4.

The relative position of the tube 11 and extension 5 is very important, as will be explained later, since not only must they be in approximate alinement, but the space between their ends must not be too large or too small. To enable this space to be regulated, I prefer to place a washer 12 between the shoulder 13 of the nozzle 3 and the end of the body 1, whereby a varying of the thickness of such washers enables me to obtain the exact space required.

Vertically through the body 1 and also the plug 9 extends a slender valve 14 slightly tapered in order to ensure a water tight fit both in the walls of the chamber 7 and in the plug 9. A radially disposed hole 15 in the valve in alinement with the bore of the tube 11, and an axial hole 16 drilled from the lower end of the valve into communication with the hole 15, enable any fluid to pass from the lower end of the valve into the tube 11. By partially turning the valve, as by means of a knurled head 17, such passage is diminished, and by a quarter or half turn, the same is wholly shut off. To secure the valve in its place, a sleeve 19 is slipped onto the lower projecting portion of the valve, and fastened thereon by upsetting the extremity of the latter, the upper end of the sleeve being made to touch the body 1 and thereby hold the valve from being withdrawn. The outer surface of this sleeve I prefer to corrugate in order the better to retain thereon the end of a rubber tube 20.

In the use of this device for cleaning an automobile or any parts thereof which are more or less oily, the tube 20 has its lower end introduced into a quantity of kerosene, and then the water is turned on. As the water is urged past the ends of the tube 11 and extension 5 and out through the hole 4, a powerful suction is created through the tube 11, holes 15, 16 and the hose 20 sufficient to bring up and mix with the water ejected from the nozzle 3 enough kerosene to cut any oily accumulations upon the running gear or other parts of the automobile; which accumulations, after being cut by the kerosene, are washed away by the jet of water, either by the water accompanying the kerosene, or by water alone after the valve has been turned to shut off the further admission of the oil.

For such parts of the automobile as are not oily, but are coated with dust and mud, the tube 20 is removed from the kerosene and dipped into a solution of soap and water, and the cleansing continued in the same manner, the valve being closed when the soapy water is to be washed off.

For the spraying of trees, shrubs and plants, the tube 20 is introduced into a liquid germicide mixture, and the work continued in much the same manner as above described.

While I have described the device as especially applicable to automobile washing, it is also well adapted for washing the outside of windows, either on the first or second floors. For this purpose, the saponified water is first used, and then the water alone to remove all traces of the soap.

The brush 22 can be attached directly to the device, screwing it upon the threaded end 21 so that the solutions will pass through its back and be received in its bristles, or it can be attached to a hose connected with the end 21.

As shown in Fig. 2, the valve 14 may be entirely tubular, so that its hole 16 reaches from end to end thereof. Thus constructed, there can be no suction up through the tube 20, since the atmosphere has free access to the tube 11, but by the mere placing of the operator's thumb upon the open upper end the suction instantly begins to act. This is very convenient in washing a car, since it requires only a quick movement of the thumb to discontinue the spraying of the soap or kerosene and throw the water alone; and then at another part of the car to begin with the cleansing compound again.

What I claim is:

1. A spraying and washing device comprising a chambered body, a nozzle at one end, an opening at the other end for receiving water under pressure, a plug removably held in the chamber and provided with a tubular portion terminating near the inner end of said nozzle, a slender valve penetrating said plug transversely from the exterior of said body, and means for admitting a liquid to said valve, the latter having an axial hole and a radial hole adapted to be put into alinement with said tube and to communicate therewith by a suitable turn of said valve.

2. A spraying and washing device comprising a body having a chamber adapted to receive a liquid under pressure, a nozzle at the end of said body opposite to that receiving the liquid, a plug located in said chamber but narrower than the latter to permit the passage of the liquid between it and the chamber-wall, a slender tube projecting from said plug nearly to the inner end of said nozzle, a tubular valve member extending transversely through said body and plug parallel with the wider sides of said plug and having a radial hole adapted to be put into communication with said tube, and a sleeve adapted to be fastened upon the lower projecting end of said valve, the upper end of the latter having means for turning it.

3. A spraying and washing device comprising a body having an opening for receiving a liquid under pressure, a nozzle, a tubular valve, means for creating a vacuum by the passage of the liquid through said nozzle, the same being controlled by said valve, and means attached to the lower end of said valve for admitting a fluid thereto, whereby the said valve being open to the atmosphere at its upper end, there can be no action upon the fluid until after the same is closed, as by the pressure of the operator's thumb.

In testimony that I claim the foregoing invention, I have hereunto set my hand this 4th day of August, 1923.

FRANCIS WILLIAM KELLEHER.